US008205046B2

(12) United States Patent
Shaw et al.

(10) Patent No.: US 8,205,046 B2
(45) Date of Patent: Jun. 19, 2012

(54) SYSTEM AND METHOD FOR SNOOPING CACHE INFORMATION USING A DIRECTORY CROSSBAR

(75) Inventors: Mark Shaw, Garland, TX (US); Stuart Allen Berke, Austin, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1489 days.

(21) Appl. No.: 11/047,539

(22) Filed: Jan. 31, 2005

(65) Prior Publication Data

US 2006/0174069 A1 Aug. 3, 2006

(51) Int. Cl.
*G06F 12/00* (2006.01)
(52) U.S. Cl. .................. 711/146; 711/E12.026
(58) Field of Classification Search .......... None
See application file for complete search history.

(56) References Cited

U.S. PATENT DOCUMENTS

| | | | |
|---|---|---|---|
| 5,778,437 A * | 7/1998 | Baylor et al. ............. 711/141 |
| 5,887,146 A | 3/1999 | Baxter et al. |
| 6,026,461 A | 2/2000 | Baxter et al. |
| 6,065,077 A | 5/2000 | Fu |
| 6,249,465 B1 * | 6/2001 | Weiss et al. ............. 365/200 |
| 6,263,403 B1 | 7/2001 | Traynor |
| 6,393,590 B1 | 5/2002 | Wood et al. |
| 6,438,659 B1 * | 8/2002 | Bauman et al. ........... 711/141 |
| 6,457,087 B1 | 9/2002 | Fu |
| 6,470,429 B1 * | 10/2002 | Jones et al. ............. 711/138 |
| 6,504,785 B1 | 1/2003 | Rao |
| 6,738,870 B2 | 5/2004 | Van Huben et al. |
| 6,738,871 B2 | 5/2004 | Van Huben et al. |
| 6,738,872 B2 | 5/2004 | Van Huben et al. |
| 2001/0037435 A1 | 11/2001 | Van Doren |
| 2002/0009095 A1 | 1/2002 | Van Doren et al. |
| 2002/0083149 A1 | 6/2002 | Van Huben et al. |
| 2002/0083243 A1 | 6/2002 | Van Huben et al. |
| 2002/0083299 A1 | 6/2002 | Van Huben et al. |
| 2002/0161907 A1 | 10/2002 | Moon |
| 2003/0229721 A1 | 12/2003 | Bonola et al. |
| 2004/0024982 A1 | 2/2004 | Le et al. |
| 2004/0024994 A1 | 2/2004 | Kurihara et al. |
| 2004/0024996 A1 | 2/2004 | Le et al. |
| 2004/0025146 A1 | 2/2004 | Kurihara et al. |
| 2005/0160132 A1 * | 7/2005 | Van Doren et al. ........... 709/200 |

OTHER PUBLICATIONS

Gustayson, David. Coherence?? Incoherence?? Scl??. [online]. Feb. 9, 1999 [retrieved on Mar. 8, 2007]. Retrieved from the Internet <URL: http://www.scizzl.com/WhatIsCoherence.html>.*

Iyer et al. Using Switch Directories to Speed Up Cache-toCache Transfers in CC-NUMA Multiprocessors. [online]. Aug. 6, 2002 [retrieved on Mar. 7, 2007]. Retrieved from the Internet <URL: http://ieeexplore.ieee.org/iel5/6818/18286/00846057.pdf?tp=&arnumber=846057&isnumber=18286>.*

Lawrence, Ramon. A Survey of Cache Coherence Mechanisms in Shared Memory Multiprocessors. [online]. May 14, 1998 [retrieved on Mar. 12, 2007]. Retrieved from the Internet <URL: http://people.ok.ubc.ca/rlawrenc/research/Papers/cc.pdf>.*

* cited by examiner

*Primary Examiner* — Reginald Bragdon
*Assistant Examiner* — Larry MacKall (57) ABSTRACT

A system and method for maintaining coherency in a symmetric multiprocessing (SMP) system are disclosed. Briefly described, in architecture, one exemplary embodiment comprises a first crossbar coupled to a plurality of local processors; a second crossbar coupled to at least one remote processor; and at least one crossbar directory that tracks access of information by a remote processor in a symmetric multiprocessing (SMP) system, the remote processor in communication with at least one of the local processors via the crossbars, such that a most current location of the information can be determined by the crossbar directory.

21 Claims, 7 Drawing Sheets

SYSTEM AND METHOD FOR SNOOPING CACHE INFORMATION USING A DIRECTORY CROSSBAR

TECHNICAL FIELD

Embodiments are generally related to symmetric multiprocessing (SMP) systems and, more particularly, are related to a system and method for using a directory crossbar system.

BACKGROUND

Symmetric multiprocessing (SMP) systems employ many parallel-operating central processing units (CPUs) which independently perform tasks under the direction of a single operating system. One type of SMP system is based upon a plurality of CPUs employing high-bandwidth point-to-point links (rather than a conventional shared-bus architecture) to provide direct connectivity between the CPU and to input/output (I/O) devices, memory units and/or other CPUs.

When tasks of a running application are being performed by a plurality of the SMP CPUs, individual CPUs may perform an operation that determines a value of information. The information may be stored temporarily in the CPUs cache memory or the like which is not accessible to other CPUs, or stored back into a memory unit to which the CPU is attached.

In one exemplary situation, the "owning" CPU is the CPU that is responsible for the most currently available information. For example, during execution of an operation, a first CPU may retrieve a value of information from a memory unit and become the owner of the information. The first CPU (now the owning CPU) may then determine a new value of the information, and write the new information to its cache memory. When other CPUs perform related operations that use the same information, it is important that those CPUs use the most current information that is available. However, the most current information may not necessarily be available to the other CPUs unless the owning CPU has stored the new information into a commonly-accessible memory unit. If the information has been determined and cached by the owning CPU, but not yet transferred to the memory unit, other CPUs must discover and retrieve the information stored in the cache memory of the owning CPU if their operation is to use the most currently available value of the information.

Snoop operations are employed by CPUs to "snoop out" the most currently available information that may be residing, for example, in another CPU's cache memory. Accordingly, if another CPU is operating on the information and saving the information into its cache, the CPU performing the snoop recognizes that most current information that is available resides in the cache of the other CPU that currently owns the information. The CPU performing the snoop then retrieves the new value of the information residing in the cache of the owning CPU. Accordingly, the CPU performs its task using the most current available information. In some situations, the CPU performing the task may modify and save the information, thereby becoming the "owning" CPU.

In other situations, a CPU owns a copy of the information without having modified the data. The information has access rights that instruct the CPU what can be done with the data. In some cases the access rights are "shared" or "read-only" meaning that the CPU that owns the information cannot modify the information. To modify the information would first require obtaining the right to modify from the directory. It is typical that this type of data is owned by several different CPUs. In that case, before the information is modified, each copy of the data must be recalled or invalidated before one CPU is allowed to modify the data. In other cases, the access rights are "exclusive" or "private" meaning that the CPU that owns the information has the only copy of the information and has the right to modify the data without alerting the system. In all of these cases, the directory is responsible for tracking which of the CPUs may own a piece of information and the access rights to the piece of information so that coherency may be maintained. The access rights are well understood by those skilled in the art as the "MESI" protocol (Modified-Exclusive-Shared-Invalid).

When a plurality of SMP CPUs coordinate information in the CPU caches or other memory units, such that tasks are performed with the most currently available information, the SMP is said to be operating in a coherent manner (coherent operation). However, when many CPUs are simultaneously performing operations in a SMP system, overall operating speed of the system is degraded since time is required for the various CPUs to perform their snooping operations, and since time is required for the subsequent retrieval of current information from remote caches and/or memories when necessary.

Figure 1:
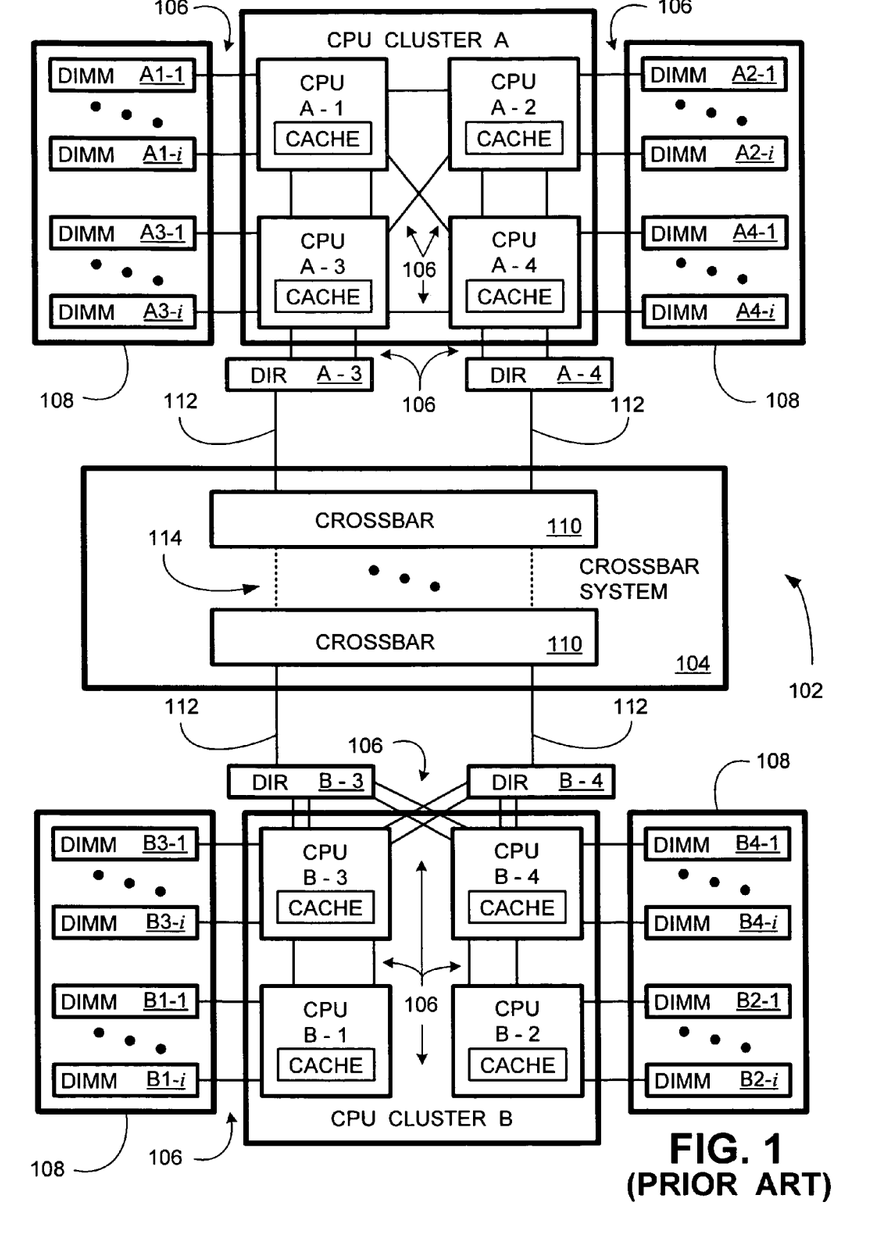
FIG. 1 is an illustrative exemplary prior art symmetric multiprocessing (SMP) system employing a plurality of central processing units (CPUs) and input/output (I/O) devices.

FIG. 1 is an illustrative exemplary prior art SMP system employing a plurality of CPUs and input/output (I/O) devices. During fabrication, clusters of CPUs may be fabricated onto a single die for convenience and efficiency. The exemplary CPU clusters A and B each have four CPUs for illustrative purposes.

CPU cluster A has four CPUs (A-1 through A-4). Similarly, CPU cluster B has four CPUs (B-1 through B-4). Each CPU has its own cache. The CPUs (A-1 through A-4, and B-1 through B-4) employ high-bandwidth, point-to-point links 106 to couple to the other CPUs of the cluster, to directories (DIR), to memory units (illustrated as dual in-line memory modules, DIMMs), and/or I/O devices (not shown).

In the simplified exemplary SMP system 102 of FIG. 1, two CPU clusters A and B are communicatively coupled together via crossbar system 104. During the fabrication process, the CPU clusters, DIMM(s) and directories may be installed on a common board. A plurality of such modular boards may be installed in a chassis, and coupled to the crossbar system 104 to facilitate communications among the various components.

As an individual CPU performs an operation that determines a new value of information, it stores a working version of the determined new information into its cache. The owning CPU, at some point during the operation, may store the determined new information into its respective DIMM, or into another DIMM, depending upon the circumstances of the operation being performed by the CPU. Accordingly, CPU A-1 may store information directly into its cache or DIMMs A1-1 through A1-*i*. Other CPUs, similarly illustrated, have their own caches and are also coupled to their own DIMMs. For example, CPU B-3 may store information into its cache and/or into DIMMs B3-1 through B3-*i*.

The CPUs are coupled to the external directories (DIR), via the CPU's high-bandwidth, point-to-point links 106. The directories are memory-based devices that are responsible for tracking information that is cached by CPUs in other CPU clusters. For example, DIR A-3 tracks information in DIMMs associated with the CPUs of CPU cluster A that has been exported from CPU cluster A via DIR A-3. When a CPU sends out a snoop request, the snoop request is sent to its directory and to the other CPUs of the cluster. When the most currently available information resides outside of the CPU cluster, the directory more quickly coordinates the determination of where the most current information is stored.

The directories are coupled together through crossbar system 104, via connections 112. Crossbar system 104 is a plurality of individual crossbars 110 coupled to each other, via connections 114, to facilitate direct device-to-device communications over the network fabric of the crossbar system 104.

For example, CPU A-3 may be ready to perform an operation using a particular value of information. However, before performing the operation, CPU A-3 would issue a snoop request to determine if a more current value of the information is available from the cache of a CPU in its cluster, from the cache of a CPU in a remote cluster, or in a remote DIMM. For this simplified illustrative example, assume that CPU B-3 (the current "owning" CPU) has just completed an operation on the information of interest, and has stored the new value of the information in its cache. Coherent operation would require that CPU A-3 operate on the most currently available information, here residing in the cache of CPU B-3. The snoop request from CPU A-3 eventually indicates that the most currently available information resides in the cache of CPU B-3. The newest value of the information is then retrieved and communicated to CPU A-3.

Furthermore, the DIR A-3 notes that CPU A-3 has most recently retrieved the information for further processing, and that other CPUs that later use this information should get the new value of information from CPU A-3 (depending upon the location of the information, which may be residing in its cache or one of its DIMMs).

The process of snooping and retrieving the most current information involves communicating a snoop from CPU A-3 to the other CPUs in the cluster and to the directories to which it is coupled to, here at least DIR A-3. DIR A-3, which is keeping track of the state of information of CPUs in cluster A, may indicate that the most current value of the information resides outside of CPU cluster A as a result of the snoop process between directories, described below.

In the simplified example above, DIR A-3 tracked that the information has previously been communicated out of CPU cluster A, via DIR A-3, to one of the CPUs in CPU cluster B. DIR A-3 sends a snoop to an appropriate subset of, or all of, the other system directories to find out where the most current value of the information is. DIR B-3, in this simplified example, responds that a CPU on its cluster has the most current information (whether it is in the cache of one of the CPUs in CPU cluster B, or whether it has been saved in one of the DIMMs coupled to CPU cluster B), and communicates the information back to DIR A-3. Then, the information received from DIR B-3 is reconciled with information from the CPUs in CPU cluster A, such that the most currently available location and/or value of the information is determined.

Furthermore, DIR A-3 notes that the information has been returned to CPU cluster A. Accordingly, if another remote CPU subsequently requires the information, upon receiving a snoop and/or request from a DIR associated with the requesting CPU, DIR A-3 knows that the most currently available information resides somewhere within CPU cluster A. DIR A-3 can then snoop the CPUs of CPU cluster A to determine the location of the information, which can then be retrieved and communicated to the requesting CPU. (Once the information is communicated to the requesting CPU, the directory associated with the requesting CPU then notes that its CPUs have the information for the next time the information is needed.)

The task of identifying the location of the information becomes even more complex when there are many CPU clusters in the SMP system. For example, consider an SMP system having ten or more CPU clusters. In some instances, with respect to the above-described example, other remote CPUs may later retrieve the information from CPU B-3 (before CPU A-3), thereby becoming the new owning CPU. When, as described in the example above, CPU A-3 begins the process of retrieving the information, many snoops across the entire SMP system will be required to identify the location of the most current value of the information (i.e.: determine the identity of the remote owning CPU). If the information has moved among several other CPUs, the process becomes even more complex and time consuming. Further complications may arise when different CPUs in different CPU clusters own a copy of the information with shared access rights. For a CPU to modify that information, all copies of the information must first be recalled or invalidated before new ownership is granted and the modification is performed.

CPU clusters A and B, DIMM units 108, crossbar system 104, DIR A-3 and DIR B-3 are discrete components. Also, the crossbar system 104 is itself a plurality of individual crossbars 110 coupled to each other to facilitate direct point-to-point communications. Accordingly, it is appreciated that the above-described process of snooping and then retrieving information requires a relatively significant amount of time, in part, due to the relatively large number of "hops" from one device to another.

Furthermore, it is appreciated that the topology of the above-described SMP system 102 is very simplistic. Many different topologies for connecting components of a CPU cluster are known. For example, the topology of CPU cluster A is illustrated differently from the topology of CPU cluster B to indicate the diversity of possible CPU clusters. Also, I/O devices may be included and/or may replace CPUs of any of the clusters. SMP systems may employ many CPU clusters. Such CPU clusters may have more than, or fewer than, the four CPUs illustrated in CPU clusters A and B. Furthermore, the many possible topologies of crossbar system 104 are possible, and accordingly, cannot be feasibly illustrated in FIG. 1 to any degree of detail. The coupling of the directories (DIR) to their respective CPUs, and the coupling to the crossbar system 104, may also vary. Accordingly, the simplified exemplary SMP system 102 of FIG. 1 is a generic SMP system that is representative of any one of the possible SMP topologies in use.

As the complexity of an SMP system increases, such as when the CPU clusters employ more CPUs, or when an SMP system employs more CPU clusters, or when more directories are used to facilitate snoop operations, more and more time will be spent for snooping operations, and the associated retrieval of cached information, such that coherency of the SMP system is maintained. Accordingly, it is desirable to improve operating time by streamlining the snooping process and the associated retrieval of cached information.

SUMMARY

One embodiment for maintaining coherency in a symmetric multiprocessing (SMP) system comprises a first crossbar coupled to a plurality of local processors; a second crossbar coupled to at least one remote processor; and at least one crossbar directory that tracks access of information by a remote processor in a symmetric multiprocessing (SMP) system, the remote processor in communication with at least one of the local processors via the crossbars, such that a most current location of the information can be determined by the crossbar directory.

Another embodiment comprises a plurality of crossbars; and a global crossbar directory integrated with each one of the crossbars, and coupled to a plurality of processors such that ownership of information by a destination processor coupled to the crossbar directory is indicated in a database of the global crossbar directory, and wherein in response to a subsequent snoop from a requesting processor, the global crossbar directory indicates that the destination processor has current ownership of the information.

Another embodiment comprises receiving from a requesting processor a snoop to determine location of a most current information of interest, the snoop received by a crossbar directory integrated with a crossbar; communicating a subsequent snoop to at least one other crossbar directory integrated with another crossbar; and receiving a response from the other crossbar directory to the subsequent snoop, the response indicating that a remote processor coupled to the other crossbar directory has current ownership of the information of interest.

Another embodiment comprises tracking ownership of information of interest accessed by a remote processor, the information of interest provided by a first processor, receiving from a requesting processor a snoop to determine location of a most current version of the information of interest, the snoop received by the global crossbar directory, communicating a subsequent snoop from the global crossbar directory to other processors residing in a processor cluster commonly with the requesting processor, receiving status information from the other processors corresponding to previous access of the information of interest by the other processors and determining the most currently available information of interest by comparing the status information from the other processors and the access information.

BRIEF DESCRIPTION OF THE DRAWINGS

The components in the drawings are not necessarily to scale relative to each other. Like reference numerals designate corresponding parts throughout the several views.

DETAILED DESCRIPTION

Figure 2:
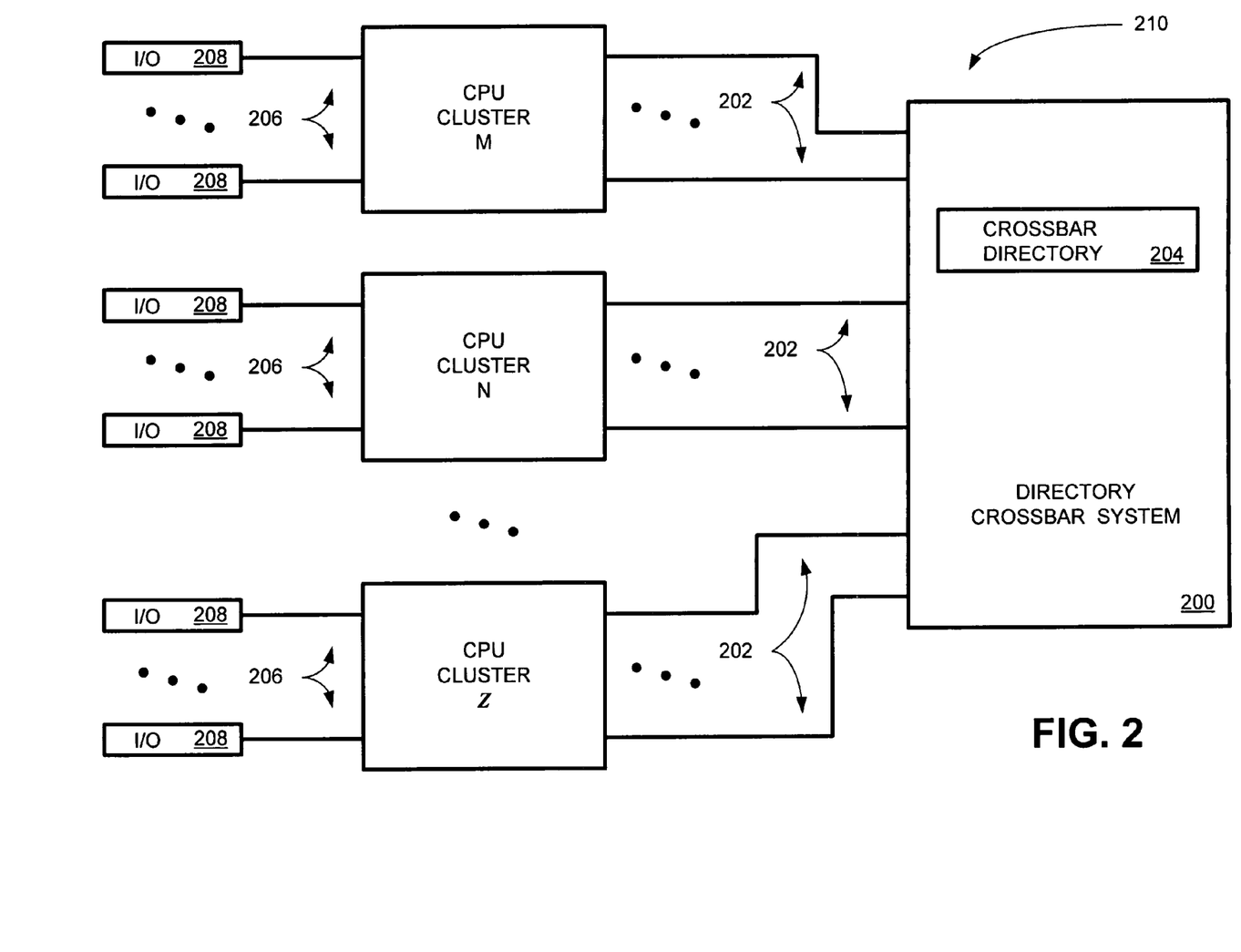
FIG. 2 is a block diagram illustrating an embodiment of a directory crossbar system.

FIG. 2 is a block diagram illustrating an embodiment of a directory crossbar system 200. The directory crossbar system 200 couples to a plurality of central processing unit (CPU) clusters M, N through Z via suitable communication links 202 M, 202 N through 202 Z, respectively. Communication links 202 M, 202 N through 202 Z are high-bandwidth, point-to-point links that couple to the processors (not shown), referred to hereinafter as central processing units (CPUs) for convenience, residing in the CPU clusters M, N through Z. Other embodiments may employ other types of communication links.

Any number of CPUs may reside in the CPU clusters M, N through Z. The links from the CPUs couple to the crossbar directory 204 residing in the directory crossbar system 200. With embodiments employing two or more crossbar directories 204, described in greater detail hereinbelow, the links from the CPUs may couple to one, more than one, or all of the crossbar directories 204. Other links 206 may couple to other devices, such as input/output devices 208.

An alternative embodiment is a symmetric multiprocessing (SMP) system 210 that employs many parallel-operating central processing units (CPUs) and at least one directory crossbar. Another embodiment is a preconfigured directory crossbar system 200 that may be integrated into a suitable SMP system.

In the various embodiments described herein, the crossbar directory enables faster determination of the location of the most current value of information (i.e.: identification of the remote owning CPU) since the crossbar directories are tracking movement (access of the information by remote CPUs) of the information across the SMP CPU clusters. That is, current ownership of the information is determinable from the crossbar directory information.

Also, the crossbar directory eliminates the hops that would otherwise occur with conventional systems. That is, since the crossbar directory and the crossbars are no longer discrete components on separate chips and/or boards, hops are eliminated and latency is improved over prior art systems since the snoop process is more quickly completed. Furthermore, the complexity of assembly is simplified since the number of connections between external devices are reduced.

Figure 3:
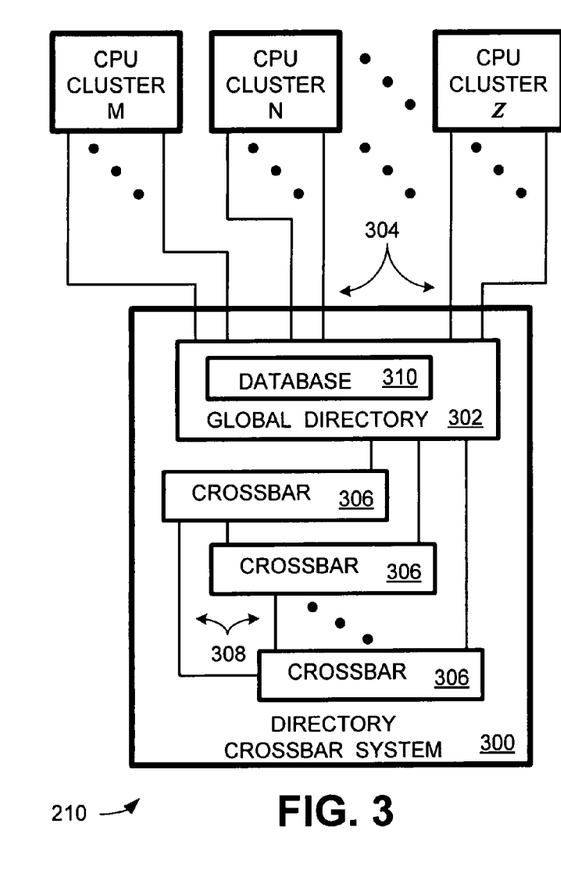
FIG. 3 is a block diagram illustrating an embodiment of a directory crossbar system employing a global directory.

FIG. 3 is a block diagram illustrating an embodiment 300 of a directory crossbar system 200 employing a global directory 302. The global directory 302 couples to all of the CPUs (not shown) of the CPU cluster groups M, N through Z, via one or more of the links 304. Links 304 may be high-bandwidth, point-to-point links or other suitable links. The global directory 302 is coupled to a plurality of crossbars 306, via connections 308. The crossbars 306 are coupled to each other, via connections 308, using any suitable crossbar architecture and/or topology, depending upon the application which the SMP system 210 (FIG. 2) has been designed for.

The global directory 302 tracks information flow between CPUs residing in different clusters such that the most current location of the information is determinable. When a value of information is passed from one CPU to a remote CPU in another cluster, the global directory 302 tracks where the information was communicated to by saving location information corresponding to the destination CPU, now the owning CPU, into database 310. Database 310 may be any suitable memory-medium, such as, but not limited to, a dual in-line memory module (DIMM), a CPU cache or the like that stores data corresponding to the most current location of the information. Thus, the global directory 302 can determine the location and access rights of the destination CPU cluster, and/or the identity of the destination CPUs, that may own a copy of the information since the location or identity of the destination CPU (or alternatively, the CPU cluster which the destination CPU resides) is saved into database 310.

Accordingly, when a requesting CPU requires the information, the requesting CPU communicates a snoop request to the global directory 302 (and, in some embodiments, to the other CPUs in its cluster). If the information has not been previously communicated to a remote CPU, then the global directory 302 may indicate such to the requesting CPU. In this case, the requesting CPU need only snoop the other CPUs residing in its CPU cluster (if it has not already done so) to identify the location of the most current information.

In the event that the information has previously been communicated to a remote CPU, in response to receiving the snoop request, the global directory 302 communicates a snoop to the remote CPU (or to the CPUs of the remote CPU cluster) identified in database 310 as being the currently owning CPU (and/or the remote CPU cluster) that last accessed the information. In response to the snoop, in one embodiment, the remote CPU that last accessed (the current owner) the information returns the information to the global directory 302. In another embodiment, the remote CPU returns related state information pertaining to the information (such as information cache status, modified access rights, or another suitable indicator).

If the global directory 302, based upon analysis of the information (and/or the state information) determines that the most currently available information resides with the remote CPU that currently owns (last accessed) the information, the global directory 302 returns the information to the requesting CPU. In the other above-described embodiment, the global directory 302, after analyzing the returned state information, then retrieves the information from the remote owning CPU, or its associated memory or cache, and then returns the information to the requesting CPU.

In one embodiment, the requesting CPU also snoops the other neighboring CPUs of its cluster. Here, the global directory 302 may return information from a remote CPU (or associated state information) that currently owns (last accessed) the information to the requesting CPU. If a neighboring CPU in the same cluster of the requesting CPU also has accessed the information (or is using, or has cached, or saved the information), the neighboring CPU may return the information (or associated state information) to the requesting CPU. Then, the requesting CPU may analyze all of the returned information from its neighboring CPU(s) and the global directory 302 to determine where the most current information resides, which may then be retrieved and used by the requesting CPU.

In an alternative embodiment, upon receiving a snoop request from the requesting CPU, the global directory 302 snoops the neighboring CPUs residing in the same CPU cluster as the requesting CPU (in addition to snooping other CPUs that have previously accessed, received and/or operated on the information, as identified in database 310). Then, the global directory 302 analyzes returned values of the information (or associated state information) from the neighboring CPUs and any responding remote CPU to determine where the most current information resides (thereby identifying the owning CPU). Then, the most current information can be retrieved and communicated to the requesting CPU in any suitable manner.

Once the global directory 302 communicates the information to the requesting CPU, or when the global directory 302 has determined that the requesting CPU has accessed the information, the global directory 302 updates database 310 to indicate that the requesting CPU is now the CPU that last accessed the information and/or is now the current owner of the information. Then, when another CPU (or even the requesting CPU) sends a subsequent snoop request to the global directory 302, the global directory 302 can determine that the requesting CPU currently owns the information (and accordingly, can determine the location where the most current information resides).

Figure 4:
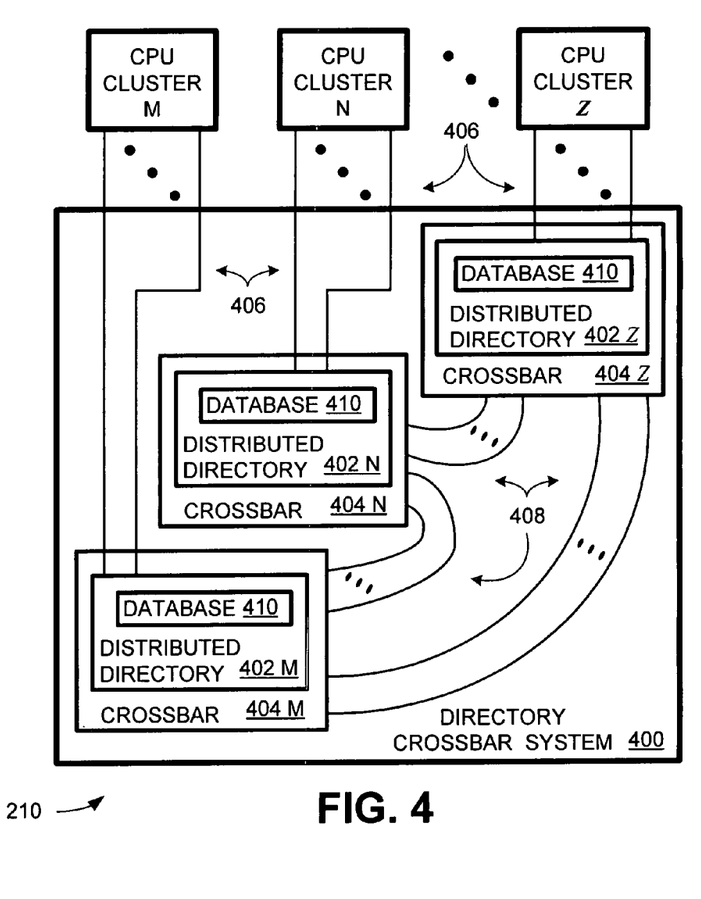
FIG. 4 is a block diagram illustrating an embodiment of a directory crossbar system employing distributed directories residing in the crossbars.

FIG. 4 is a block diagram illustrating an embodiment 400 of a directory crossbar system 200 employing distributed directories 402 (illustrated with reference numerals 402 M, 402 N through 402 Z) residing in the crossbars 404 (illustrated with reference numerals 404 M, 404 N through 404 Z, respectively). A distributed directory 402 is coupled to CPUs (not shown) of one of the CPU cluster groups M, N through Z, via one or more of the links 406. Links 406 may be high-bandwidth, point-to-point links or other suitable links. The crossbars 404 are coupled to each other, via connections 408, using any suitable crossbar architecture and/or topology, depending upon the application that the SMP system 210 (FIG. 2) has been designed for.

In one embodiment, the distributed directories 402 track information flow between CPUs residing in different clusters such that the owning CPU is readily identifiable (i.e.; the location of the most current information is determinable). When a value of information is passed from one CPU to a remote CPU in another cluster, via one of the crossbars 404, its distributed directory 402 tracks where the information was communicated to by saving location information corresponding to the destination CPU (and/or the remote CPU cluster), now the new owning CPU, into database 410. Database 410 may be any suitable memory medium, such as, but not limited to, a DIMM, cache or the like that stores data corresponding to the most current location of the information. Each distributed directory 402 has its own database 410. Thus, the distributed directories 402 can determine the location of a destination CPU cluster, and/or the identity of the destination/owning CPU, that last received the information since the location and/or owning CPU (or CPU cluster) identity is saved into a database 410. Accordingly, when a requesting CPU requires the information, the requesting CPU communicates a snoop request to the distributed directory 402 to which it is coupled to (and, in some embodiments, to the other CPUs in its cluster).

In the event that the information has previously been communicated to a remote CPU, in response to receiving the snoop request, the distributed directory 402 communicates a snoop to the other distributed directories 402. The other distributed directories 402, because they are tracking information that is associated with the CPU cluster to which they are coupled to, can identify the remote CPU that currently owns (last accessed) the information. The distributed directory 402 that is tracking receipt of the information by a CPU in its cluster group can respond accordingly to the distributed directory 402 issuing the snoop.

In response to the snoop, in one embodiment, the remote CPU that currently owns (last accessed) the information returns the information to its distributed directory 402, which then communicates the information to the distributed directory 402 coupled to the requesting CPU. In another embodiment, the remote CPU returns related state information pertaining to the information (such as information cache status, modified access rights, or another suitable indicator) to its distributed directory 402.

If the distributed directory 402 coupled to the requesting CPU, based upon analysis of the information (and/or the state of the information), determines that the most currently available information resides with the remote CPU that currently owns (last accessed) the information, the distributed directory 402 causes retrieval of the information from the remote CPU and communication of the information to the requesting CPU. For example, but not limited to, the distributed directory 402 coupled to the requesting CPU, after analyzing the returned state information, then retrieves the information from the remote CPU, or its associated memory or cache, and then returns the information to the requesting CPU. Here, the requesting CPU may now become the current owner of the information.

In one embodiment, the requesting CPU also snoops the other neighboring CPUs of its cluster. Here, the distributed directory 402 that it is coupled to may return to the requesting CPU information from a remote CPU (or associated state information) that previously accessed/owned the information. If a neighboring CPU in the same cluster of the requesting CPU also has previously accessed/owned the information (or is using, or has cached, or saved the information), the neighboring CPU may return the information (or associated state information) to the requesting CPU. Then, the requesting CPU may analyze all of the returned information from its neighboring CPU(s) and its distributed directory 402 to determine where the most current information resides, which may then be retrieved and used by the requesting CPU.

In an alternative embodiment, upon receiving a snoop request from the requesting CPU, the distributed directory 402 also snoops the neighboring CPUs residing in the same CPU cluster as the requesting CPU (in addition to snooping other CPUs that have previously accessed, received and/or or operated on the information (thereby owning the information), as identified in database 410. Then, the distributed directory 402 analyzes returned values of the information (or associated state information) from the neighboring CPUs and any responding remote distributed directory 402 to determine where the most current information resides. Then, because the crossbar directories are tracking ownership of information, the most current information can be retrieved and communicated to the requesting CPU in any suitable manner.

Once a distributed directory 402 communicates the information to the requesting CPU, or when the distributed directory 402 has determined that the requesting CPU has accessed, and thus now owns, the information, the distributed directory 402 updates its database 410 to indicate that the requesting CPU is now the CPU that currently owns the information. Then, when another CPU (or even the requesting CPU) sends a subsequent snoop request to the distributed directory 402, the distributed directory 402 can determine that the requesting CPU currently owns the information (and accordingly, can determine the location where the most current information resides).

In an alternative embodiment, the remote distributed directory 402 coupled to the remote CPU that previously owned the information, updates its database to indicate that its CPU no longer owns information. Thus, when a subsequent snoop for the information is received, that remote distributed directory 402 will not respond.

For example, when one of the CPUs in CPU cluster M transmits a snoop request to the distributed directory 402 M, the distributed directory 402 M determines whether the information has been previously communicated to, and thus now owned by, a remote CPU, based upon information in its database 410. This determination is made by issuing a snoop request to the other distributed directories 402. Alternatively, the distributed directory 402 M may have tracked whether or not the information has previously been communicated to, and thus previously owned by, a remote CPU. If the information has not been previously owned by a remote CPU, then the distributed directory 402 M indicates such to the requesting CPU. In this case, the requesting CPU need only snoop the other CPUs residing in CPU cluster M (if it has not already done so) to identify the location of the most current information.

As an alternative example, assume that the information has been previously communicated to, and thus owned by, a remote CPU in CPU cluster N, which has been tracked by the distributed directory 402 N (that is, information has been saved into the database 410 N indicating that a CPU in cluster N has accessed, and thus now currently owns, the information). In one exemplary embodiment, the distributed directory 402 N indicates to distributed directory 402 M of the previous ownership of the information. Then, using any of the above described techniques, the location of the most current information may be determined by distributed directory 402 M.

However, as another variation in the above example, assume that a CPU in CPU cluster Z accesses the information before the CPU of CPU cluster M requests or snoops for the information. When the information is transferred from the CPU in CPU cluster N to the CPU in CPU cluster Z, the distributed directory 402 N may update its database 410 N to indicate that it no longer owns the most current information. When the information is transferred from the CPU in CPU cluster N to the CPU in CPU cluster Z, the distributed directory 402 Z updates its database 410 Z to indicate that a CPU in cluster Z now owns information (has the most current information). Accordingly, when the CPU causes distributed directory 402 M to issue a snoop for the information, the distributed directory 402 Z indicates to distributed directory 402 M of the previous ownership of the information.

In another embodiment, the distributed directory tracks which remote CPU owns the information of interest. When information is transferred from the CPU in CPU cluster M to the CPU in CPU cluster N, the distributed directory 402 N updates its database 410 M to indicate that one of the CPUs associated with CPU cluster N has ownership of the most current information. When the information is later transferred from the CPU in CPU cluster N to the CPU in CPU cluster Z, the distributed directory 402 M updates its database 410 M to indicate that one of the CPUs associated with CPU cluster Z currently owns the information. With this embodiment, the distributed directory 402 M tracks the cluster that has the most current value of information at any given time.

Summarizing, in one embodiment, a distributed directory 402 tracks when one of its CPUs has accessed, and thus has ownership of, the information. That way, other distributed directories can issue a snoop, and the distributed directory can indicate that one of its CPUs has access to (or owns) the most current information. Alternatively, in another embodiment, a distributed directory 402 tracks which remote CPUs have accessed the information. That way, when one of its CPUs or another one of the distributed directories issues a snoop for the information, the distributed directory can indicate which of the SMP CPUs owns the most current information.

Figure 5:
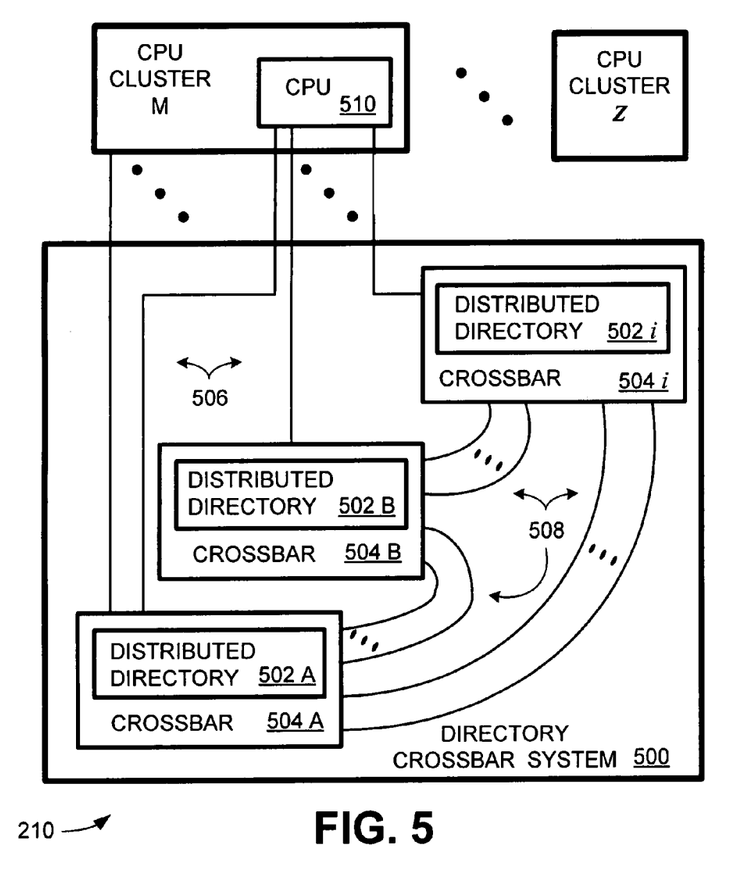
FIG. 5 is a block diagram illustrating another embodiment of a directory crossbar system employing distributed directories residing in the crossbars.

FIG. 5 is a block diagram illustrating another embodiment 500 of a directory crossbar system 200 employing distributed directories 502 (illustrated with reference numerals 502 A, 502 B through 502 $i$) residing in the crossbars 504 (illustrated with reference numerals 504 A, 504 B through 504 $i$, respectively). Distributed directories 502 are coupled to the CPUs (not shown) of the CPU cluster groups M through Z, via one or more of the links 506. Links 506 may be high-bandwidth, point-to-point links or other suitable links. The crossbars 504 are coupled to each other, via connections 508, using any suitable crossbar architecture and/or topology, depending upon the application that the SMP system 210 (FIG. 2) has been designed for.

The embodiment of the directory crossbar system 500 differs from the directory crossbar system 400 (FIG. 4) in that CPUs of a CPU block are not each coupled to a common distributed directory 502. Rather, a link from one CPU of a CPU cluster is coupled to one distributed directory, and the other CPUs of the same CPU cluster are coupled to other distributed directories. For example, CPU 510 residing in CPU cluster M has a link coupling to distributed directory 502 A, has a link coupling to distributed directory 502 B, and a link coupling to distributed directory 502 $i$. Depending upon the number of links that an individual CPU has, and depending upon the design of the SMP system 210 that specifies the number of links allocated to coupling the CPUs to the directory crossbar system 500, it is appreciated that the coupling of an exemplary CPU to the directory crossbar system 500 may be implemented in a nearly unlimited manner to form any desired architecture and/or topography.

Accordingly, any particular distributed directory tracks the information associated to those CPUs to which the distributed directory is coupled to. Each of the distributed directories 502 A, B through i have a database (not shown). When a CPU needs access to current information, the requesting CPU communicates a snoop to its distributed directory. The distributed directory then snoops the other distributed directories residing in the directory crossbar system 500. If the current information is discovered at a remote owning CPU during the snoop process, the current information is retrieved and returned to the requesting CPU in any of the manners described herein.

Furthermore, embodiments of the directory crossbar systems 400 (FIG. 4) or 500 (FIG. 5) may have CPUs coupled to more than one distributed directory if links are allocated for coupling to multiple distributed directories. Such embodiments provide a high degree of design freedom when the architecture and/or topology of the SMP system is designed.

Figure 6:
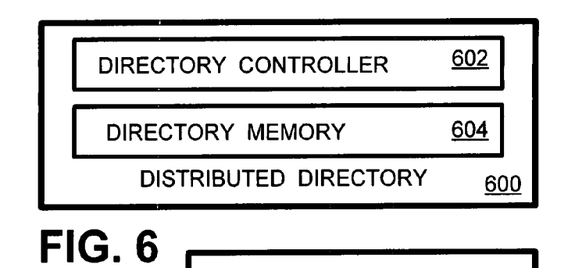
FIGS. 6-8 illustrate various exemplary embodiments of distributed directories.
Figure 7:
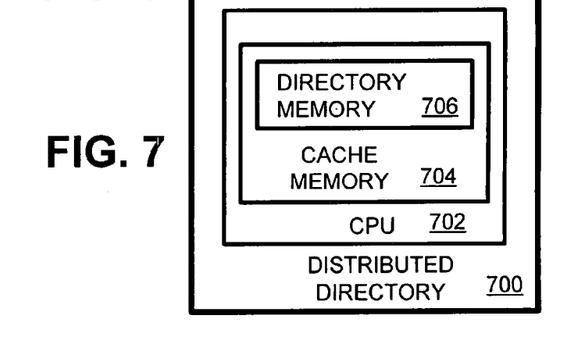
Figure 8:
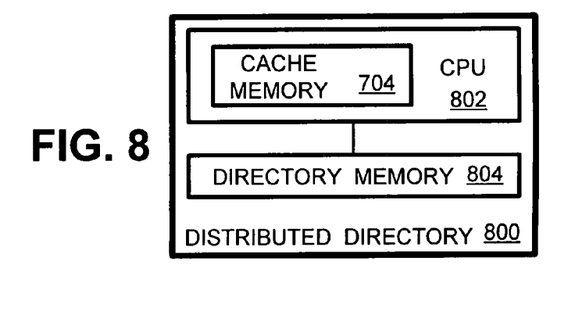

FIGS. 6-8 illustrate various exemplary embodiments 600, 700 and 800, of distributed directories 600, 700 and 800, respectively. Other directory architectures and/or topologies may be designed depending upon the particular applications of the SMP system 210 (FIG. 2). Accordingly, the distributed directories 600, 700 and 800 are intended as nonlimiting illustrative examples.

The distributed directory 600 uses a directory controller 602 to track information flow between CPUs such that the location of the information is determinable. The directory controller 602 initiates snoops to other directory controllers in response to receiving a snoop request from a CPU to which it is coupled to, responds to snoop requests received from other directory controllers, saves database information indicating that one of its CPUs has accessed (and therefore, has current ownership of) the information (and, accordingly, indicates that its CPU has the most current information), may clear or modify database information indicating another CPU currently owns the information (and, accordingly, indicates that its CPU no longer has the most current information), and controls communications over the links (not shown) that couples it to the CPUs, other distributed directories and/or the crossbars. Directory controller 602 may be implemented as a state device, a processing device executing logic retrieved from a memory, or a combination state and processing device. The database described hereinabove resides in the directory memory 604, which may be any suitable memory medium.

The distributed directory 700 uses a CPU 702 to track information flow between CPUs such that the location of the information is determinable. The CPU 702 initiates snoops to other directory controllers in response to receiving a snoop request from a CPU to which it is coupled to, responds to snoop requests received from other directory controllers, saves database information indicating that one of its CPUs has accessed and/or has current ownership of the information (and, accordingly, indicates that its CPU has the most current information), may clear or modify database information indicating another CPU has accessed and/or currently owns the information (and, accordingly, indicates that its CPU no longer has the most current information), and controls communications over the links (not shown) that couples it to the CPUs, other distributed directories and/or the crossbars. CPU 702 may be implemented using any suitable commercially available processing device or from a specially designed dedicated processing device. The directory memory 706 of the distributed directory 700 described hereinabove resides in the cache memory 704, which may be any suitable memory medium used as a cache by the CPU 702.

Similarly, the distributed directory 800 uses a CPU 802 to track information flow between CPUs such that the location of the information is determinable. The CPU 802 also initiates snoops to other directory controllers in response to receiving a snoop request from a CPU to which it is coupled to, responds to snoop requests received from other directory controllers, saves database information indicating that one of its CPUs has accessed and/or currently owns the information (and, accordingly, indicates that its CPU has the most current information), may clear or modify database information indicating another CPU has accessed and/or currently owns the information (and, accordingly, indicates that its CPU no longer has the most current information), and controls communications over the links (not shown) that couples it to the CPUs, other distributed directories and/or the crossbars. CPU 802 may be implemented using any suitable commercially available processing device or from a specially designed dedicated processing device. The database described hereinabove resides in directory memory 804 which is external to CPU 802, and may be any suitable memory medium accessible by the CPU 802. Furthermore, in an alternative embodiment, the directory memory 804 resides outside of the distributed directory as a stand alone memory device. A nonlimiting example of memory 804 is one or more DIMMs.

Furthermore, the CPU 802, in some embodiments, includes its own cache 704. That cache 704 may also be used to store database information, much like the above-described embodiment of the distributed directory 800.

Figure 9:
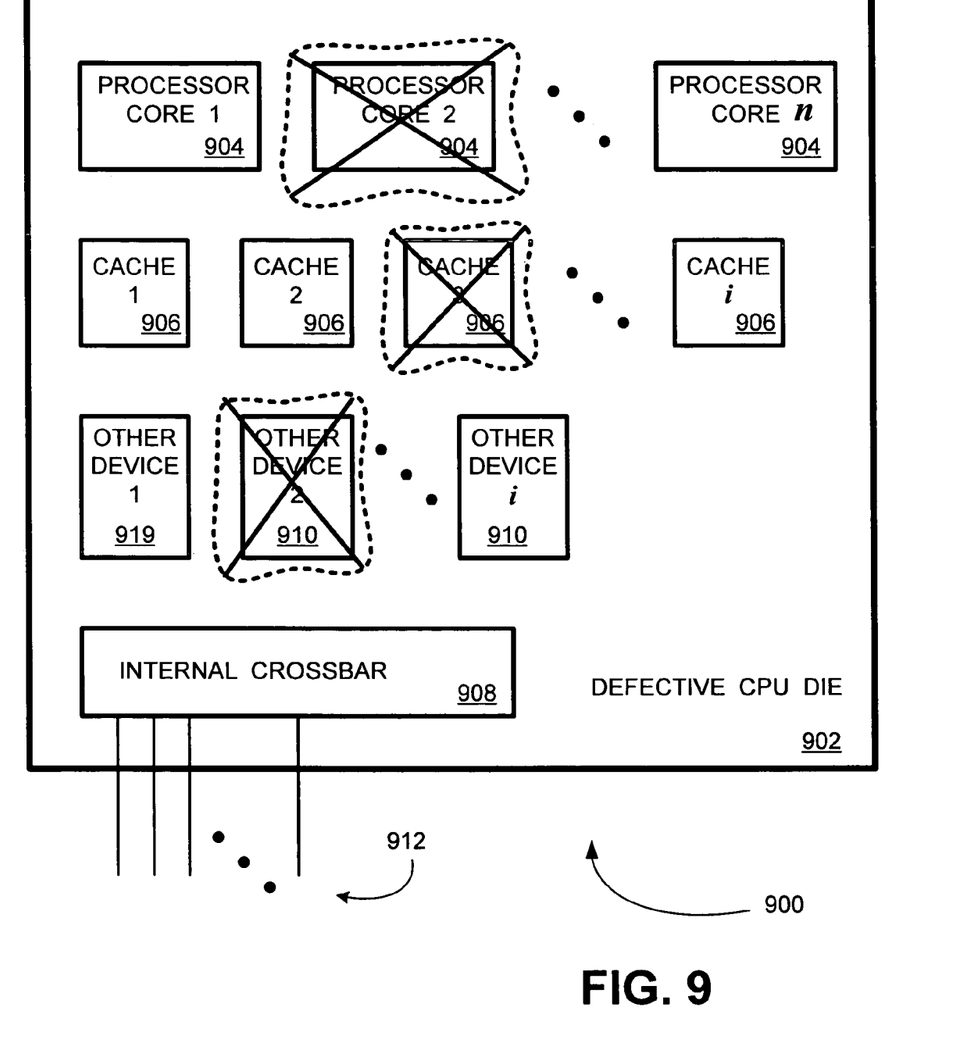
FIG. 9 is a block diagram illustrating an embodiment of a directory crossbar system based upon a defective CPU die.

FIG. 9 is a block diagram illustrating an embodiment of a directory crossbar system 900 based upon a defective CPU die 902. During the fabrication process which transforms a raw silicon wafer into many hundreds of discrete processing devices or systems, some of the formed processing devices or systems may be defective. Testing may be performed on the processing devices or systems after they are cut into individual dies to identify defective dies. After good dies (those dies passing initial testing) are encapsulated in a protective medium (forming an integrated chip), further testing may determine which processing devices or systems are defective. For convenience, such defective components are referred to hereinafter as a defective CPU die (assuming that at least one of the components is defective). Such defective CPU dies 902 often include other components on the die, such as one or more processor cores 904, one or more cache memories 906, at least one internal crossbar 908, and one or more other devices 910.

Chip sets having one or more CPUs, one or more caches and at least one internal crossbar are relatively expensive to produce. Because of their complexity, difficulties in successfully forming the circuitry, and impurities or defects in the silicon wafer itself, defective dies are frequently encountered. Typically, such defective dies are discarded because they are not able to perform their intended function. However, such defective dies may be suitable for modification into a directory crossbar system 900. Such a directory crossbar system 900 may be similar to the above-described CPU-based distributed directory 700 and/or 800 (FIGS. 7 and 8, respectively).

In the exemplary a directory crossbar system 900, defective CPU die 902, the working components (the processor core(s) 904, the internal crossbar 908 and/or caches 906) are salvaged to construct the a directory crossbar system 900. Defective components or components that are not needed may be deactivated by any suitable means (indicated as being crossed out in FIG. 9). (Internal connections between the working components are not shown for brevity). Links 912 couple the internal crossbar 908 to the CPUs and/or other distributed directories as described hereinabove.

If a suitable number of caches 906 are available, the directory crossbar system 900 may function like the above-described distributed directory 700 (FIG. 7). If a suitable number of caches 906 are not available, the directory crossbar system 900 may function like the above-described distributed directory 800 (FIG. 8) by adding or coupling the a directory crossbar system 900 to other suitable memory devices.

Figure 10:
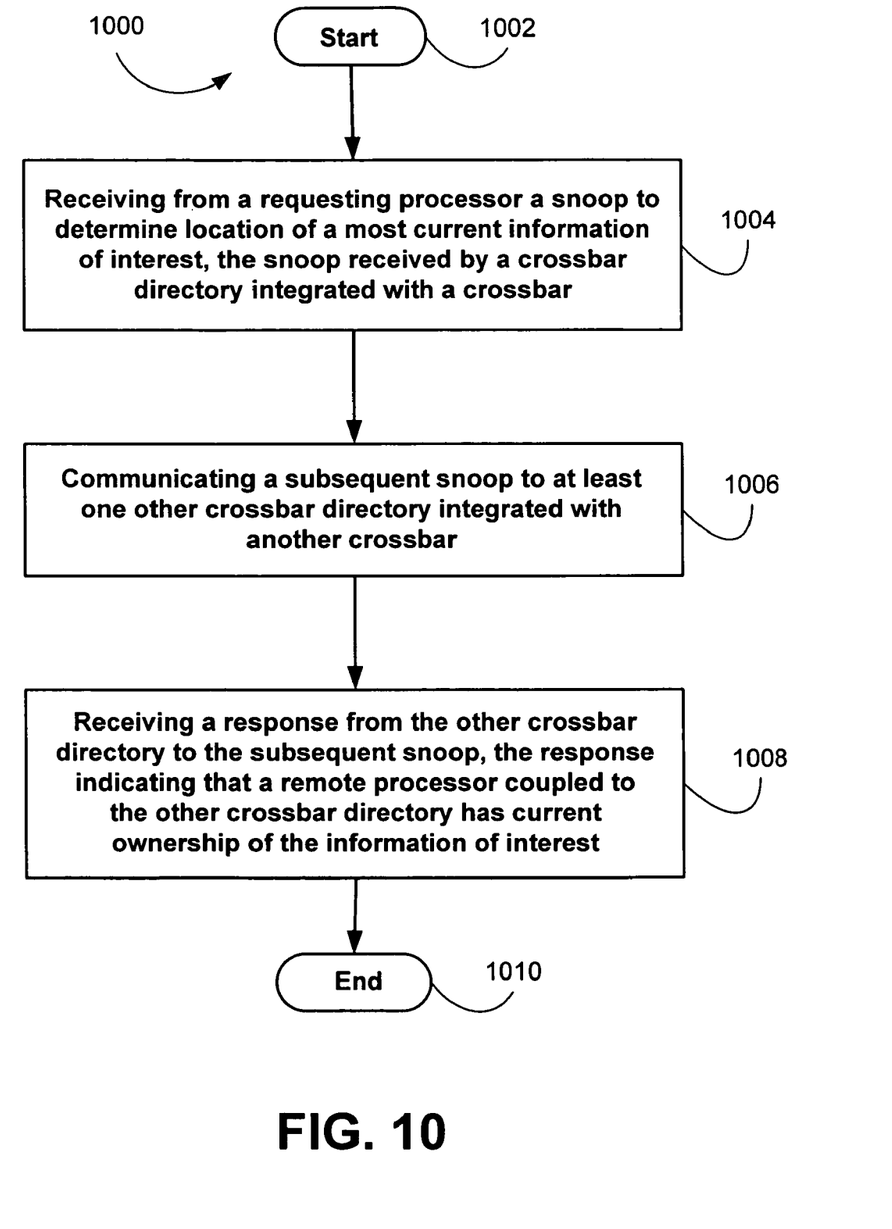
FIGS. 10 and 11 are flowcharts illustrating an embodiment of a process for maintaining coherency in a SMP system.
Figure 11:
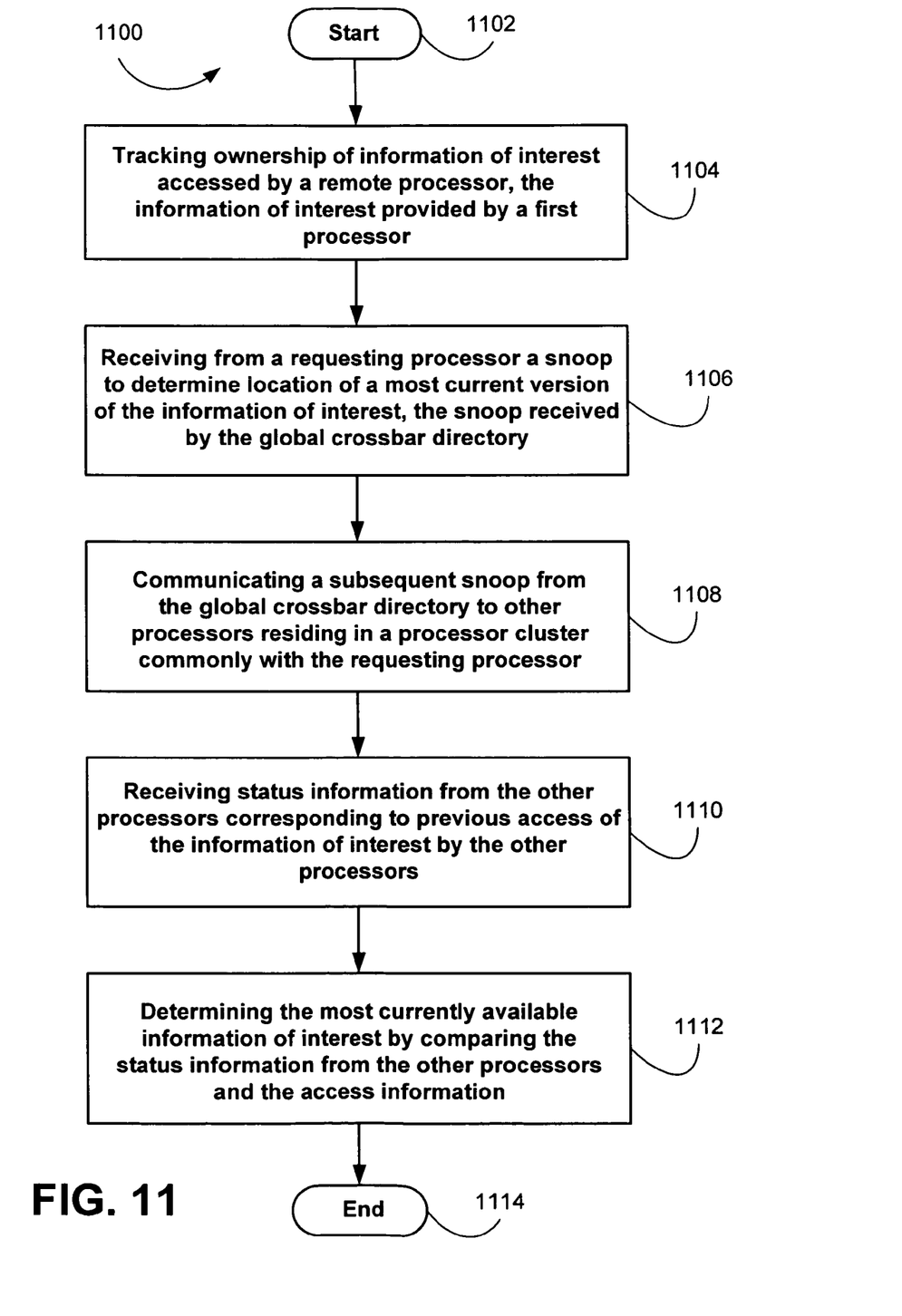

FIGS. 10 and 11 show flow charts 1000 and 1100, respectively, illustrating processes used by embodiments of a directory crossbar system 200, 300, 400 and/or 500. (FIG. 2-5, respectively). The flow charts 1000 and 1100 show the architecture, functionality, and operation of an embodiment for implementing a directory crossbar system 200, 300, 400 and/or 500. Alternative embodiments may implement the logic of flow charts 1000 and 1100 with hardware configured as a state machine. In this regard, each block may represent a module, segment or portion of code, which comprises one or more executable instructions for implementing the specified logical function(s). It should also be noted that in alternative embodiments, the functions noted in the blocks may occur out of the order noted in FIG. 10 or 11, or may include additional functions. For example, two blocks shown in succession in FIG. 10 or 11 may in fact be substantially executed concurrently, the blocks may sometimes be executed in the reverse order, or some of the blocks may not be executed in all instances, depending upon the functionality involved, as will be further clarified hereinbelow. All such modifications and variations are intended to be included herein within the scope of this disclosure.

The process of flow chart 1000 (FIG. 10), for maintaining coherency in a SMP system 210 (FIGS. 2-5), begins at block 1002. At block 1004, a snoop is received from a requesting processor to determine the location of a most current information of interest, the snoop received by a crossbar directory integrated with a crossbar. At block 1006, a subsequent snoop is communicated to at least one other crossbar directory integrated with another crossbar. At block 1008, a response is received from the other crossbar directory to the subsequent snoop, the response indicating that a remote processor coupled to the other crossbar directory has current ownership of the information of interest. The process ends at block 1010.

The process of flow chart 1100 (FIG. 11), for maintaining coherency in a SMP system 210 (FIGS. 2-5) with a global crossbar directory integrated with a plurality of crossbars, begins at block 1102. At block 1104, ownership of information of interest accessed by a remote processor is tracked, the information of interest provided by a first processor. At block 1106, a snoop is received from a requesting processor to determine location of a most current version of the information of interest, the snoop received by the global crossbar directory. At block 1108, a subsequent snoop is communicated from the global crossbar directory to other processors residing in a processor cluster commonly with the requesting processor. At block 1110, status information is received from the other processors corresponding to previous access of the information of interest by the other processor. At block 1112, the most currently available information of interest is determined by comparing the status information from the other processors and the access information. The process ends at block 1114.

Embodiments for maintaining coherency in a SMP system 210 (FIG. 2) employing a cache memory 704 (FIG. 7) and/or a directory memory 804 (FIG. 8) may be implemented using any suitable computer-readable medium. In the context of this specification, a "computer-readable medium" can be any means that can store, communicate, propagate, or transport the data associated with, used by or in connection with the instruction execution system, apparatus, and/or device. The computer-readable medium can be, for example, but not limited to, an electronic, magnetic, optical, electromagnetic, infrared, or semiconductor system, apparatus, device, or propagation medium now known or later developed.

Embodiments described above also track accesses to information by input/output (I/O) devices having processors or CPUs. I/O devices may access the information for various reasons. Accordingly, the distributed directories 402 residing in crossbars to which I/O devices are coupled to will track access of information in any the above-described processes employed by the various embodiments.

It should be emphasized that the above-described embodiments are merely examples of the disclosed system and method. Many variations and modifications may be made to the above-described embodiments. All such modifications and variations are intended to be included herein within the scope of this disclosure.

What is claimed is:

1. A directory crossbar system for a symmetric multiprocessing (SMP) system, comprising:
   a global directory directly connected to a plurality of central processing unit (CPU) clusters of the SMP system, each of the plurality of CPU clusters comprising a plurality of central processing units (CPUs); and
   a plurality of crossbars coupled to each other and to the global directory.

2. The directory crossbar system of claim 1, wherein the global directory comprises a database.

3. The directory crossbar system of claim 2, wherein the database is configured to store location information corresponding to a current version of information, the current version of information capable of use among the plurality of CPU clusters.

4. The directory crossbar system of claim 3, wherein the database is configured to provide the current version of information to a requesting CPU responsive to a snoop request.

5. The directory crossbar system of claim 3, wherein the location information comprises an identity of a CPU that owns the current version of information.

6. The directory crossbar system of claim 2, wherein the database is configured to indicate whether the current version of information has been passed to a destination CPU.

7. The directory crossbar system of claim 2, wherein the global directory further comprises:
   a processing unit;
   a cache residing in the processing unit; and
   the database residing on the cache such that ownership of a current version of information by a destination CPU coupled to the global directory is indicated in the database.

8. The directory crossbar system of claim 2, wherein the global directory further comprises:
   a processing unit;
   a memory coupled to the processing unit; and
   the database residing on the memory such that ownership of a current version of information by a destination processor coupled to the global directory is indicated in the database.

9. The directory crossbar system of claim 2, wherein the global directory further comprises:
a directory controller;
a directory memory coupled to the directory controller; and
the database residing on the directory memory such that ownership of a current version of information by the destination processor coupled to the global directory is indicated in the database.

10. A directory crossbar system for a symmetric multiprocessing (SMP) system, comprising:
a plurality of central processing unit (CPU) clusters of the SMP system, each of the plurality of CPU clusters comprising a plurality of central processing units (CPUs);
a plurality of crossbars coupled to each other, each of the plurality of crossbars connected exclusively to a respective one of the plurality of CPU clusters;
a plurality of distributed directories, each distributed directory residing in each crossbar of the plurality of crossbars, each distributed directory configured to track flow of information between CPUs in different CPU clusters;
a first directory of the plurality of distributed directories residing in a first crossbar of the plurality of crossbars;
a second directory of the plurality of distributed directories residing in a second crossbar of the plurality of crossbars;
wherein the first directory is configured to:
receive a first snoop request for information from a requesting CPU of the plurality of CPUs; and
responsive to the first snoop request, communicate a second snoop request to the second directory;
wherein the second directory is configured to, responsive to the second snoop request, identify whether a destination CPU associated with the second directory last accessed the information irrespective of whether a modification to that information has occurred.

11. The directory crossbar system of claim 10, wherein each distributed directory comprises a database configured to store location information of a current version of information.

12. The directory crossbar system of claim 11, wherein the location information comprises an identity of a CPU of one of the plurality of CPU clusters that owns the current version of information.

13. The directory crossbar system of claim 11, wherein the database is configured to provide the current version of information to a requesting CPU of the plurality of CPU clusters responsive to a snoop request.

14. The directory crossbar system of claim 13, wherein the snoop request is from a CPU of one of the plurality of CPU clusters that is different than the CPU cluster dedicated to the database.

15. The directory crossbar system of claim 14, wherein the snoop request is from a CPU of one of the plurality of CPU clusters that is the same as the CPU cluster dedicated to the database.

16. The directory crossbar system of claim 11, wherein the plurality of distributed directories are configured to communicate snoop requests to one another.

17. The directory crossbar system of claim 11, wherein each of the plurality of distributed directories are configured to update its respective database when a CPU of the CPU cluster associated with the each of the plurality of distributed directories no longer owns the current version of information.

18. The directory crossbar system of claim 17, wherein responsive to a snoop request, the each of the plurality of distributed directories associated with a CPU cluster that no longer owns the current version of information does not respond.

19. The directory crossbar system of claim 11, wherein each distributed directory further comprises:
a processing unit;
a cache residing in the processing unit; and
a database residing on the cache wherein location information corresponding to a current version of information resides.

20. The directory crossbar system of claim 11, wherein each distributed directory further comprises:
a processing unit;
a memory coupled to the processing unit; and
a database residing on the memory wherein location information corresponding to a current version of information resides.

21. The directory crossbar system of claim 11, wherein each distributed directory further comprises:
a directory controller;
a directory memory coupled to the directory controller; and
a database residing on the directory memory wherein location information corresponding to a current version of information resides.

* * * * *